(12) United States Patent
Broden (10) Patent No.: US 7,591,184 B2
(45) Date of Patent: Sep. 22, 2009

(54) INDUSTRIAL PRESSURE SENSOR HAVING ENHANCED DIELECTRIC FILL FLUID

(75) Inventor: David A. Broden, Andover, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 12/080,532

(22) Filed: Apr. 3, 2008

(65) Prior Publication Data

US 2008/0223140 A1 Sep. 18, 2008

Related U.S. Application Data

(63) Continuation-in-part of application No. 11/724,747, filed on Mar. 16, 2007, now Pat. No. 7,377,176.

(51) Int. Cl.
*G01L 19/04* (2006.01)

(52) U.S. Cl. ............................. 73/718; 73/724

(58) Field of Classification Search ............ 73/700–756
See application file for complete search history.

(56) References Cited

U.S. PATENT DOCUMENTS

| 4,184,189 | A | 1/1980 | Davis et al. |
| 4,754,365 | A | 6/1988 | Kazahaya |
| 4,996,627 | A | 2/1991 | Zias et al. |
| 6,295,875 | B1 | 10/2001 | Frick et al. |
| 6,675,655 | B2 | 1/2004 | Broden et al. |
| 6,782,754 | B1 | 8/2004 | Broden et al. |
| 6,843,133 | B2 | 1/2005 | Broden et al. |
| 7,080,558 | B2 | 7/2006 | Broden et al. |
| 7,124,641 | B2 | 10/2006 | Broden et al. |
| 7,308,830 | B2 * | 12/2007 | Harasyn et al. ............... 73/718 |
| 7,334,484 | B2 * | 2/2008 | Harasyn et al. ............... 73/718 |
| 7,377,176 | B1 * | 5/2008 | Broden ........................ 73/753 |
| 2007/0169557 | A1 * | 7/2007 | Harasyn et al. ............... 73/718 |

OTHER PUBLICATIONS

Official Search Report of the International Searching Authority in counterpart foreign Application No. PCT/US2009/002075 filed Apr. 2, 2009.

* cited by examiner

*Primary Examiner*—Andre J Allen
(74) *Attorney, Agent, or Firm*—Kinney & Lange, P.A.

(57) ABSTRACT

A capacitive pressure sensor for an industrial process transmitters comprises a housing, a sensing diaphragm, an electrode and a fill fluid. The housing includes an interior cavity and a channel extending from an exterior of the housing to the cavity. The sensing diaphragm is disposed within the interior cavity opposite the electrode. The fill fluid occupies the interior cavity such that a pressure from the channel is conveyed to the sensing diaphragm to adjust a capacitance between the electrode and the sensing diaphragm. The fill fluid has a dielectric constant higher than about 3.5. In various embodiments, the pressure sensor has a diameter less than approximately 3.175 centimeters (~1.25 inches), the electrode has a diameter less than approximately 1 cm (~0.4 inches), the pressure sensor has a capacitance of approximately 5 to approximately 10 pico-farads, and the fill fluid is comprised of hydraulic fluid having a liquid additive.

27 Claims, 3 Drawing Sheets

INDUSTRIAL PRESSURE SENSOR HAVING ENHANCED DIELECTRIC FILL FLUID

CROSS-REFERENCE TO RELATED APPLICATION(S)

This application claims priority as a continuation-in-part under 35 U.S.C. § 120 of an earlier filed application entitled "Nano-Particle Modified Fill Fluid For Pressure Transmitters" by David A. Broden, filed on Mar. 16, 2007 and having Ser. No. 11/724,747, which is assigned to the same assignee as the present application.

BACKGROUND

This invention relates generally to process instruments used in industrial process control systems. More particularly, the present invention relates to capacitive pressure sensors used in pressure transmitters.

Process instruments are used to monitor process parameters, such as pressure, temperature, flow and level, of process fluids used in industrial processes. For example, process transmitters are typically employed in industrial manufacturing facilities at multiple locations to monitor a variety of process parameters along various production lines. Process transmitters include sensors that produce an electrical output in response to physical changes in the process parameter. For example, pressure transmitters include capacitive pressure sensors that produce an electrical output as a function of the pressure of a process fluid, such as water lines, chemical tanks or the like. Each process transmitter also includes transmitter electronics for receiving and processing the electrical output of the sensor so that the transmitter and process parameter can be monitored locally or remotely. Locally monitored transmitters include displays, such as LCD screens, that show the electrical output at the site of the process transmitter. Remotely monitored transmitters include electronics that transmit the electrical output over a control loop or network to a central monitoring location such as a control room. Configured as such, the process parameter can be regulated from the control room by including automated switches, valves, pumps and other similar components in the control loop.

A typical capacitive pressure sensor used in a pressure transmitter includes a fixed electrode plate and an adjustable electrode plate, which typically comprises a flexible sensing diaphragm. The sensing diaphragm is connected to the process fluid through a simple hydraulic system that communicates the process fluid pressure to the sensor. The hydraulic system comprises a sealed passageway in which the sensing diaphragm is positioned at a first end, and a flexible isolation diaphragm is positioned at a second end to engage the process fluid. The sealed passageway is filled with a precise amount of hydraulic fluid that adjusts the position of the sensing diaphragm as the process fluid influences the isolation diaphragm. As the pressure of the process fluid changes the position of the sensing diaphragm changes, resulting in a change in capacitance of the pressure sensor. The electrical output of the pressure sensor is related to the capacitance and thus changes proportionally as the process fluid pressure changes.

The capacitance of the pressure sensor is controlled by three main factors: the surface area of the electrode plates, the distance between the electrode plates and the magnitude of the dielectric constant of the matter between the electrode plates, typically the fill fluid. It is generally desirable to produce pressure sensors as small as possible such that they can be used in a greater number of applications. The lower limit on the spacing between the electrodes is limited by the ability of the capacitor to function properly. The lower limit on the surface area of the plates is dictated by the necessity of the pressure sensor to generate a signal having a minimum strength compatible with the transmitter electronics. The dielectric constant of the matter between the plates is limited by the types of fill fluids that are compatible with the hydraulic system. Based on these design constraints, the minimum diameter of the electrode plates typically used in capacitive pressure sensors has generally been limited to about 0.4 inches (~1 cm) or more, resulting in pressure sensors having diameters of about 1.25 inches (~3.175 cm). Furthermore, past manufacturing processes have not been able to produce smaller capacitive pressure sensors, which require extremely low tolerances to achieve the desired precision. There is, therefore, a need for smaller capacitive pressure sensors having improved capacitances.

SUMMARY

The present invention is directed to a capacitive pressure sensor for use in industrial process transmitters. The pressure sensor comprises a housing, a sensing diaphragm, an electrode and a fill fluid. The housing includes an interior cavity disposed within the housing, and a channel extending from an exterior of the housing to the interior cavity. The sensing diaphragm is disposed within the interior cavity. The electrode is disposed within the interior cavity to oppose the sensing diaphragm. The fill fluid occupies the interior cavity such that a pressure from the channel is conveyed to the sensing diaphragm to adjust a capacitance between the electrode and the sensing diaphragm. The fill fluid has a dielectric constant higher than about 3.5. In other embodiments, the pressure sensor has a diameter less than approximately 3.175 centimeters (~1.25 inches), with the electrode having a diameter less than approximately 1 cm (~0.4 inches). In another embodiment, the pressure sensor has a capacitance of approximately 5 to approximately 10 pico-farads. In yet other embodiments, the fill fluid is comprised of hydraulic fluid having a liquid additive such as isopropyl alcohol, acetone, ethylene glycol and glycerin.

DETAILED DESCRIPTION

Figure 1:
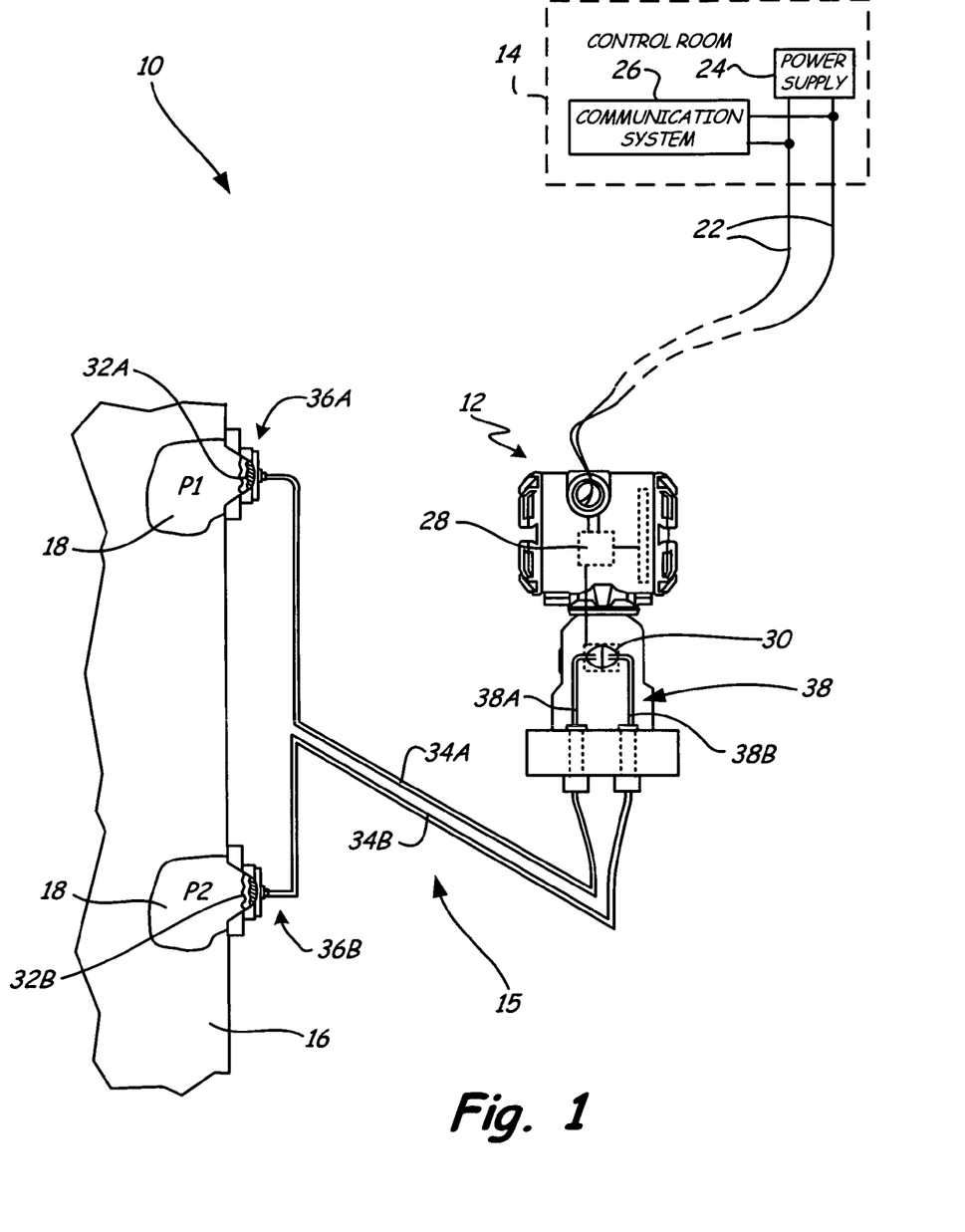
FIG. 1 shows a process control system including a pressure transmitter having a capacitive pressure sensor of the present invention.

FIG. 1 shows process control system 10, which includes pressure transmitter 12, control room 14, remote seal system 15 and process vessel 16. Pressure transmitter 12 senses the pressure level of process fluid 18 contained in process vessel 16 through remote seal system 15 and then relays a pressure signal to control room 14 over control loop 22. Control room 14 also supplies power to transmitter 12 from power supply 24 over control loop 22. Control loop 22 also enables communication system 26 to transmit data from control room 14 to transmitter 12, and to receive data from transmitter 12, so that process parameters of process fluid 18 can be monitored and adjusted. In various embodiments, control loop 22 and communication system 26 operate over a digital network protocol such as FOUNDATION™ Fieldbus, or an analog network protocol such as a 4-20 mA HART® system. Pressure transmitter 12 includes transmitter circuitry 28 and sensor 30. Transmitter circuitry 28 includes components for transmitting electrical signals generated by pressure sensor 30 over control loop 22 to control room 14 or a local display such as an LCD screen, or both. Based on the data received from sensor 30 and transmitter 12, control room 14 is able to adjust process parameters either through control loop 22 or another control loop. For example, control room 14 can adjust the flow of process fluid 18 to vessel 16 by adjusting appropriate valves.

Sensor 30 is hydraulically connected with process fluid 18 through remote seal system 15; which includes remote seal isolation diaphragms 32A and 32B, capillaries 34A and 34B and remote seals 36A and 36B; and hydraulic isolation tubes 38A and 38B. Isolation tubes 38A and 38B comprise passageways that are coupled with isolation diaphragms in transmitter 12 at their first ends and sensor 30 at their second ends. Hydraulic isolation tubes 38A and 38B are supplied with a first fill fluid. Capillaries 34A and 34B extend from the transmitter isolation diaphragms to diaphragms 32A and 32B of remote seals 36A and 36B at vessel 16, where diaphragms 32A and 32B contact process fluid 18. Capillaries 34A and 34B are filled with a second fill fluid. The second hydraulic fluid transmits the pressure of process fluid 18 from vessel 16 to transmitter 12, while the first hydraulic fluid transmits the pressure of process fluid 18 from transmitter 12 to sensor 30 through isolation tubes 38A and 38B. The composition of the first fill fluid also affects the performance of pressure sensor 30. Specifically, sensor 30 comprises a capacitive pressure sensor into which the first fill fluid flows to comprise the dielectric material of the capacitor comprising the sensor. According to the present invention, the first fill fluid is comprised of a material having a dielectric constant such that the capacitance of the pressure sensor can be increased and the size of the pressure sensor can be decreased, as compared to pressure sensors having typical, industry standard hydraulic fill fluids.

Figure 2:
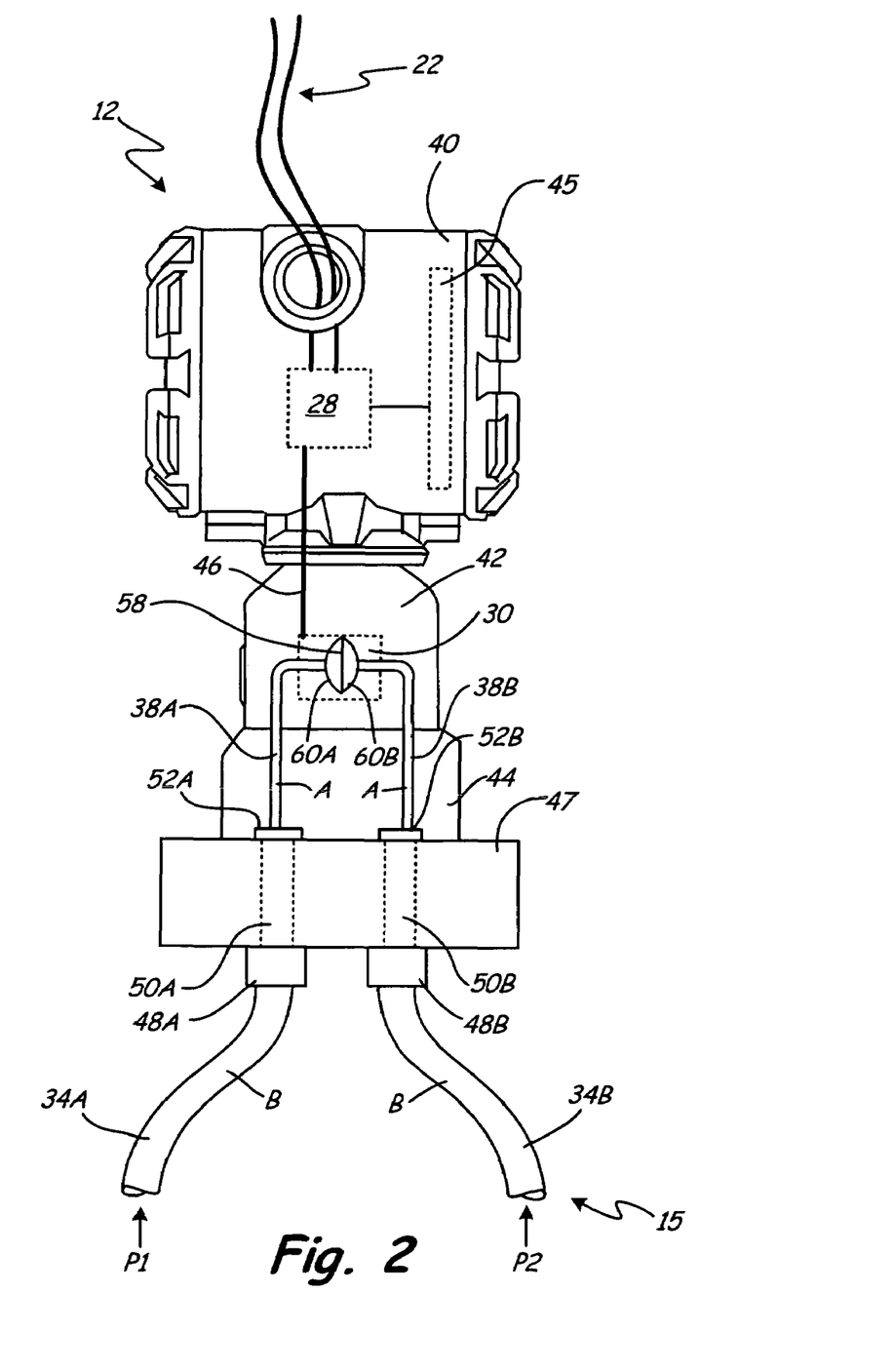
FIG. 2 is a schematic side view of the pressure transmitter of FIG. 1 including a capacitive pressure sensor configured for differential pressure measurement.

FIG. 2 shows pressure transmitter 12 including an embodiment of the present invention in which capacitive pressure sensor 30 comprises a differential pressure sensor having a fill fluid with a dielectric constant substantially greater than 2.2. Process transmitter 12 includes transmitter circuitry 28, sensor 30, hydraulic isolation tubes 38A and 38B, housing 40, module 42, base 44 and LCD 45. Sensor 30 senses a physical change in the pressure of process fluid 18 (FIG. 1) through fill fluid A of hydraulic isolation tubes 38A and 38B and fill fluid B of capillaries 34A and 34B of remote seal system 15. Sensor 30 is in electronic communication with transmitter circuitry 28 through cable 46. Circuitry 28 conditions the output of sensor 30 into a format compatible with control loop 22, whereby the output is relayed for local monitoring at LCD 45 connected to electronics 28, or to control room 14 (FIG. 1.) through control loop 22. In other embodiments, transmitter circuitry 28 communicates over a wireless network. In still other embodiments, the conditioned output of sensor 30 is readable by a handheld device linked by wires or wirelessly with pressure transmitter 12.

Isolation tubes 38A and 38B are connected to capillaries 34A and 34B through process flange 47. Process flange 47 is typically bolted or otherwise secured to base 44 of transmitter 12. In one embodiment flange 47 comprises a COPLANAR™ process flange. Flange 47 includes channels 50A and 50B, which are connected with capillaries 34A and 34B, respectively, of remote seal system 15. Capillaries 34A and 34B are connected with flange 47 through couplers 48A and 48B, which can comprise any coupling system such as threaded couplers. Process flange 47 facilitates connection of capillaries 34A and 34B with isolation tubes 38A and 38B, respectively. Capillaries 34A and 34B of remote seal system 15 allows isolation tubes 38A and 38B to extend beyond the confines of transmitter 12. Isolation tubes 38A and 38B allow pressure sensor 30 to be brought into contact with the exterior of transmitter 12.

Sensor 30 is a transducer that produces an electrical signal in response to a change in the pressure of process fluid 18 as presented through first fill fluid A of isolation tubes 38A and 38B. Sensor 30 comprises a differential, capacitance-based pressure cell comprising sensing diaphragm 58, first electrode plate 60A and second electrode plate 60B. Sensor 30 is in fluid communication with diaphragms 52A and 52B of base 44 through fill fluid A within isolation tubes 38A and 38B, which are positioned within module 42. Isolation diaphragms 52A and 52B are in fluid communication with process fluid 18 (FIG. 1) through fill fluid B within channels 50A and 50B of flange 47 and capillaries 34A and 34B of remote seal system 15. Process fluid 18 has an associated pressure P1 that exerts a force on isolation diaphragm 32A of remote seal 36A (FIG. 1) nearer the top of vessel 16. Process fluid 18 also has an associated pressure P2 nearer the bottom of vessel 16 that exerts a force on isolation diaphragm 32B of remote seal 36B (FIG. 1). P1 is transmitted from isolation diaphragm 32A by second fill fluid B of capillary 34A to isolation diaphragm 52A of transmitter 12, such that the pressure in capillary 34A equals pressure P1. Likewise, P2 is transmitted from isolation diaphragm 32B by second fill fluid B of capillary 34B to isolation diaphragm 52B of transmitter 12, such that the pressure in capillary 34B equals pressure P2. The forces associated with P1 and P2 are transmitted from isolation diaphragms 52A and 52B to sensing diaphragm 58 by first fill fluid A, such that the pressures in isolation tubes 38A and 38B equal pressure P1 and P2, respectively. As such a pressure differential P1−P2 is created across sensing diaphragm 58 of sensor 30 by fill fluid A. Fill fluid A occupies sensor 30 to surround sensing diaphragm 58 and occupy the space between sensing diaphragm 58 and electrode plates 60A and 60B. Thus, the capacitance of pressure sensor 30 is directly related to the dielectric constant of fill fluid A. Fill fluid A comprises a liquid having a higher dielectric constant than what has previously been used in capacitive pressure sensors compatible with industrial process control systems. Specifically, fill fluid A has a dielectric constant substantially higher than approximately 2.2, which enables the size of sensor 30 to be decreased and the capacitance of sensor 30 to be increased, among other benefits.

Sensing diaphragm 58 is typically comprised of a circular, stainless steel disk disposed between electrode plates 60A and 60B, which typically comprise circular, metal coatings deposited on interior curved surfaces of sensor 30 to oppose diaphragm 58. Sensing diaphragm 58 is pinched between the peripheries of the curved surfaces such that it is able to flex between electrode plates 60A and 60B. As such, sensor 30 comprises three electrically isolated metallic plates arranged as two capacitors in series that form a generally cylindrical sensor having a width and a diameter. The capacitance between diaphragm 58 and first electrode plate 60A and the capacitance between diaphragm 58 and second electrode plate 60B changes as the curvature of diaphragm 58 changes due to variations in pressures P1 and P2, as presented through fill fluids A and B. Capacitance between diaphragm 58 and one of electrode plates 60A or 60B will increase while the other will decrease. The change in capacitance of each capacitor due to the pressure change is measured by transmitter circuitry 28 as an indication of the change in magnitude of the differential pressure between pressures P1 and P2.

Generally speaking, the capacitance of a capacitor is an indication of the amount of energy stored on electrode plates comprising the capacitor. The capacitance C is proportional to the area A of the electrode plates and the dielectric constant $\in$ of the material between the electrode plates, and inversely proportional to the distance X between the electrode plates, as shown in equation (1).

$$C = \frac{\varepsilon A}{X} \qquad \text{Equation (1)}$$

For a capacitive pressure sensor, the output strength of the signal generated by the pressure sensor is determined by the charge stored on the capacitors. In sensor 30, a first capacitor is formed by sensing diaphragm 58 and first electrode plate 60A, and a second capacitor is formed by sensing diaphragm 58 and second electrode plate 60B. There must be enough charge stored on the first and second capacitors such that sensor 30 is capable of producing signals great enough to be used by transmitter circuitry 28 and control loop 22. Typically, a capacitive pressure sensor must have a capacitance of about 5 µF to about 10 µF in order for transmitter circuitry 28 to produce an output compatible with control loops such as 4-20 mA analog control loops. Similarly, the dielectric constant $\in$ of the dielectric material is fixed by the selected fill fluid. It is also desirable to reduce the sizes of the first and second capacitors such that the width and diameter of sensor 30 can also be reduced. Thus, pressure sensor design and size has historically been constrained by control loop and fill fluid requirements, as well as manufacturing technology limitations.

Typically, the dielectric constant $\in$ of the fill fluid has been limited to small magnitudes due to the mechanical performance requirements needed of the fill fluid. For example, fill fluids must be substantially incompressible such that the fill fluid is able to effectively and accurately transmit pressure. For example, in sensor 30, fill fluid A must be able to transmit very small deflections of diaphragm 52A to sensing diaphragm 58 without the deflection being completely absorbed by compression of fill fluid A. Fill fluids must also be substantially inert so as to prevent reaction with other sensor components. For example, in sensor 30, fill fluid A must not react with sensing diaphragm 58 and electrode plate 60A. Fill fluids that meet these demands are typically comprised of silicone-oil hydraulic fluids, such as DC 200®, DC 704® or Syltherm XLT® silicone-oil as is commercially available from Dow Corning Corporation, Midland, Mich., USA. However, other similar fluids are also used. These hydraulic fluids have dielectric constants in the range of about 2.2 to about 2.4, thus limiting the size to which a typical dielectric pressure sensor can be reduced.

The width of any pressure sensor is limited by the ability to reduce distance X between adjacent capacitor plates without interfering with the performance of the capacitors. Due to field effects, there is a practical limitation as to how close electrode plates can be brought together before the dielectric material between the plates breaks down and electrons are able to jump between the plates thereby destroying the capacitance of the capacitor. For example, the width of pressure sensor 30 is related to the spacing between sensing diaphragm 58 and first electrode plate 60A and second electrode plate 60B. Thus, electrode plates 60A and 60B are typically placed as close to sensing diaphragm 58 as practically allowed without interfering with the performance of the capacitors. In most capacitive pressure sensors, including pressure sensor 30, distance X can typically be reduced to about 0.001 inches (~0.00254 cm) at upper pressure ranges before the capacitance of the fill fluid breaks down or becomes unstable.

With distance X fixed by the capacitor design limitations, and dielectric constant $\in$ typically fixed based on fill fluid requirements, the area of the electrode plates must be large enough to produce a capacitance of 5 µF to about 10 µF. Based on equation (1), it typically has been necessary for the diameters of the electrode plates to be about 0.4 inches (~1 cm) or greater to reach the required capacitance, resulting in sensors having diameters of about 1.25 inches (~3.175 cm) or greater. It is, however, desirable to reduce the size of pressure sensors and to increase the capacitance without increasing the diameters of the electrode plates. The present invention achieves capacitive pressure sensors having effective capacitances in sensors having diameters smaller than 1.25 inches (~3.175 cm) by using fill fluids that have dielectric constants substantially higher than 2.2, which is available from typical hydraulic fluids. In one embodiment, pressure sensor 30 has a diameter of approximately 0.5 inches (~1.27 cm). The smaller sizes of pressure sensor 30 are achieved by using modern manufacturing processes that enable precise, low tolerance production of sensor 30 and its components.

Figure 3:
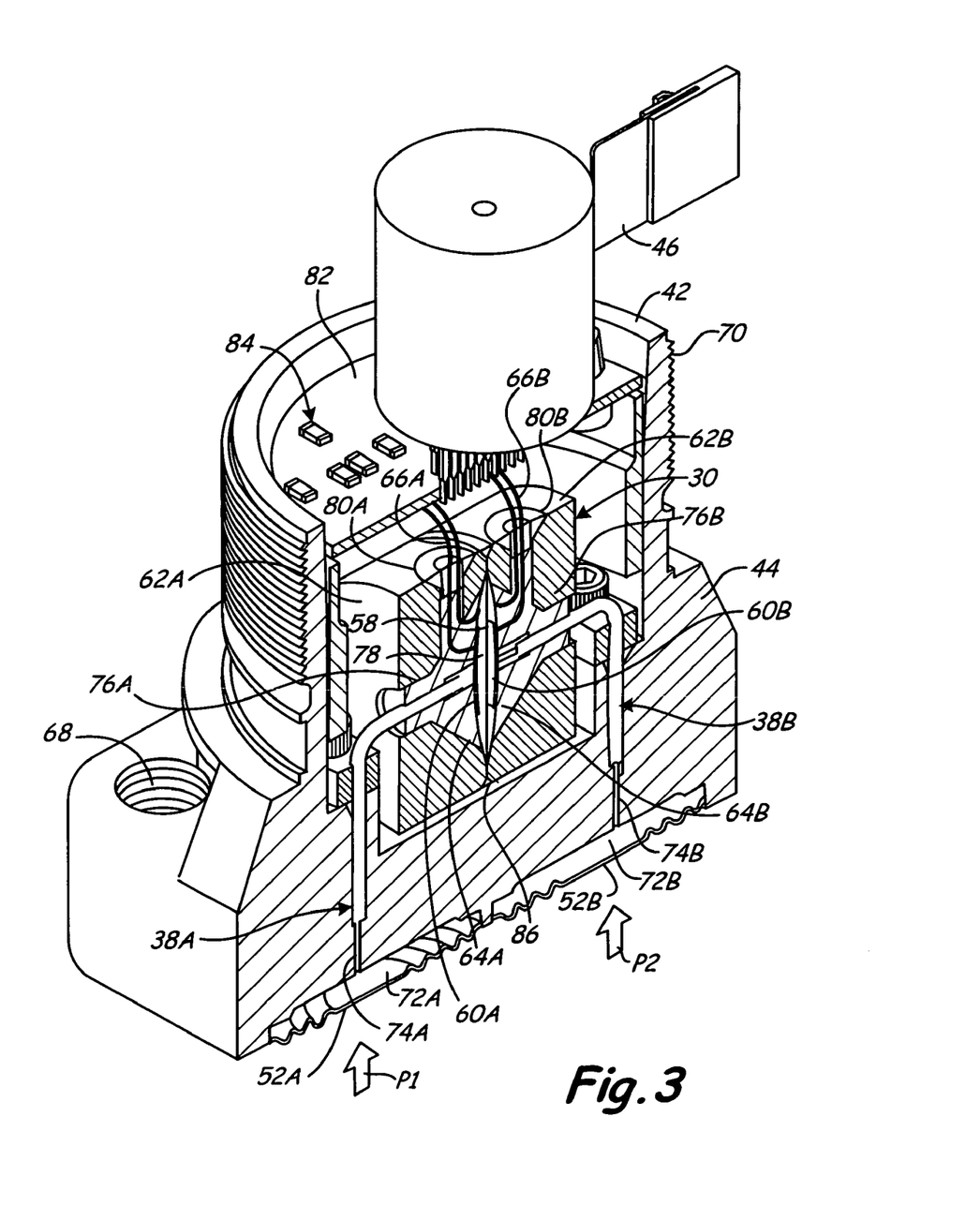
FIG. 3 shows a perspective view of a differential pressure module used within the pressure transmitter of FIG. 2.

FIG. 3 shows a perspective view of one embodiment of pressure sensor 30 and module 42 used within differential pressure transmitter 12 of FIG. 2. Pressure sensor 30 is deposited on base 44 within module 42 of transmitter 12. Pressure sensor 30 includes isolation tube 38A, isolation tube 38B, sensing diaphragm 58, first electrode plate 60A, second electrode plate 60B, first cell half 62A, second cell half 62B, first insulator 64A, second insulator 64B, first lead wires 66A and second lead wires 66B. Cable 46 connects lead wires 66A and 66B of pressure sensor 30 with transmitter circuitry 28 within housing 40 (FIG. 2) of transmitter 12. Base 44 connects isolation tubes 38A and 38B of sensor 30 with flange 47 (FIG. 2) and remote seal system 15 (FIG. 1).

Module 42 and base 44 are typically cast and machined as a unitary piece, with module 42 primarily comprising a hollowed out cavity for holding sensor 30. Module 42 and base 44 together provide a framework that permits diaphragms 52A and 52B to communicate with sensor 30 through isolation tubes 38A and 38B. Base 44 includes bores 68 such that transmitter 12 can be connected to flange 47 or some other process connection. Module 42 includes threads 70 for connecting with housing 40 of transmitter 12. Base 44 also includes counterbores that, along with isolation diaphragms 52A and 52B, form isolation chambers 72A and 72B, respectively. Isolation chambers 72A and 72B are connected with isolation tubes 38A and 38B, respectively, by bores 74A and 74B provided in base 44. Isolation tubes 38A and 38B typically comprise segments of stainless steel tubing welded to base 44 and cell halves 62A and 62B. Isolation tubes 38A and 38B are connected with insulators 64A and 64B, respectively, which are disposed in bores 76A and 76B, respectively, within sensor cell halves 62A and 62B. Insulators 64A and 64B comprise cup-shaped platforms upon which electrodes 60A and 60B are deposited, respectively. The cup shaped platforms mate when cell halves 62A and 62B are assembled to form interior cavity 78 within sensor 30. Insulators 64A and 64B are comprised of any suitable insulating material such as glass or ceramic. Insulators 64A and 64B include bores that extend through to interior cavity 78 such that isolation tubes 38A and 38B connect isolation chambers 72A and 72B with interior cavity 78. Sensing diaphragm 58 is disposed between cell halves 62A and 62B within interior cavity 78 such that diaphragm 58 opposes electrodes 60A and 60B. Typically, diaphragm 58 and electrode plates 60A and 60B are comprised of corrosion resistant materials. Electrodes 60A and 60B are connected to lead wires 66A and 66B, respectively, which extend through insulators 64A and 64B and exit cell halves 62A and 62B at openings 80A and 80B, respectively. Lead wires 66A and 66B are connected to circuit board 82, which includes various sensor electronics 84. Circuit board 82 is connected to transmitter electronics 28 within housing 40 through ribbon cable 46.

Configured as such, sensing diaphragm 58 and electrodes 60A and 60B comprise first and second capacitors within sensor 30. Each capacitor produces an electrical signal as pressures P1 and P2 act upon sensing diaphragm 58. Pressure sensor 30 thus produces dual capacitance signals, which helps reduce error produced by sensor 30. Typically, as described above, it was necessary for such a sensor to have electrodes with diameters of about 0.4 inches (~1 cm) based on the preferred use of silicone-oil fill fluids. Thus, production of smaller sensor modules was typically not achievable as capacitor electrodes were required to be of sufficient size to generate a capacitance large enough to be compatible with transmitter electronics signal processing capability. Fortuitously, manufacturing processes historically available were not typically capable of producing sensor cells, insulators and electrodes with precise enough tolerances to produce smaller sensors. For example, the depth of internal cavity 78 (e.g. the distance between the rim of insulator 64A and the trough of insulator 64A) was limited to about 0.0035 inches (~0.00889 cm) based on available grinding technology. Similarly, the thickness of electrodes was limited to about 2000 Angstroms (~0.0002 mm) based on available deposition technology. As such, sensor technology settled such that typical sensors had the above dimensions, as smaller sensors were not possible. The present invention combines the capabilities of current manufacturing techniques and the use of high dielectric fill fluids to achieve sensors having enhanced dielectric capabilities and electrodes having diameters less than approximately 0.04 inches (~0.1 cm) such that sensors have diameters less than approximately 1.25 inches (~3.175 cm). In one embodiment of the invention, sensor 30 has a diameter of approximately 0.5 inches (~1.27 cm) including electrode plates 60A and 60B having diameters of approximately 0.1 inches (~0.254 cm).

In one embodiment, fill fluid A comprises isopropyl alcohol, which has a dielectric constant of about 18.3. In another embodiment, fill fluid A comprises acetone, which has a dielectric constant of about 20.7. In yet another embodiment, fill fluid A comprises glycerin, which has a dielectric constant of about 47. In another embodiment, fill fluid A comprises Ethylene Glycol, with has a dielectric constant of about 37. These liquid additives have dielectric constants substantially higher than the 2.2 available from typical silicone-oil hydraulic fluids. Specifically, these high-dielectric-constant liquid additives have dielectric constants that are approximately nine times greater or more than what is available from commercially available hydraulic fluids. Fill fluid A can be comprised of up to 100% of these high-dielectric constant liquids. Other high-dielectric constant liquids not specifically mentioned can be used in other embodiments of the invention.

In other embodiments, fill fluid A is comprised of a solution of the high-dielectric-constant liquid additives and a typical, commercial hydraulic fluid. Hydraulic fluids compatible for blending include the above-mentioned DC 200®, DC 704® or Sylthemm XLT® silicone oils available from Dow Corning Corporation, but other hydraulic fluids can be used. The above-mentioned liquid additives and the hydraulic fluid can be mixed into solutions comprising from zero to one hundred percent of each liquid to better obtain the advantages of each fluid. For example, it may be desirable to retain some of the inertness of DC 200, while adding the capacitance of a liquid additive such as isopropyl alcohol. In another embodiment, fill fluid A comprises up to 20% citric acid, which has a dielectric constant of about 200. The solution of the liquid additive and the hydraulic fluid will mix with each other to form a homogeneous and miscible mixture. The liquid additive will thus contribute to the properties of the overall fill fluid solution in quantities proportional to the volumetric distribution of the hydraulic fluid and liquid additive volume. For example, a fill fluid having fifty percent by volume liquid additive and fifty percent by volume hydraulic fluid will have electrical and mechanical properties (e.g. dielectric constant and viscosity) that are an average of the electrical and mechanical properties of the hydraulic fluid and liquid additive. This is advantageous over other solid fill fluid additives, such as nano-particles, that saturate at concentration levels of about twenty-five percent and tend to only remain in a suspended state at concentration levels of about one to five percent. Nano-particles have dielectric constants in the range of about 3.5 to about 7.0. For example, ceramic alumina nano-particles have a dielectric constant of about 4.5; aluminum oxide nano-particles have a dielectric constant of about 7.0 and carbon based nano-particles have a dielectric constant of about 3.5. Liquid additives, however, will remain in solution, not separating over time. Furthermore, solid particulate additives cannot influence as many physical properties of the fill fluid as can a liquid additive. For example, a solid additive cannot effect the viscosity of the underlying hydraulic fluid, while a liquid additive can.

The high-dielectric constant materials identified above, and others, have physical properties compatible for use in the hydraulic systems of the present invention. Specifically, the liquid additives have sufficient inertness, viscosity and compressibility that provide adequate performance in isolation tubes 38A and 38B. The liquid additives are suitably inert such that they do not react with isolation tubes 38A and 38B, sensing diaphragm 58, electrode plates 60A and 60B and insulators 64A and 64B. These materials are composed of highly corrosion resistant materials, such as stainless steel and glass, such that they are able to withstand contact with fill fluid A and the liquid additives. The liquid additives are also suitably incompressible such that they are able to transmit pressure from isolation diaphragms 52A and 52B to sensing diaphragm 58. Typical pressure sensors and pressure transmitters operate in industrial process control systems that include process fluids that reach pressures upwards of several thousand psi. Such great pressures produce a small, but acceptable amount of compression of typical fill fluids, such as silicone-oil hydraulic fluids. Such compression is mitigated by vacuum sealing of fill fluid lines of pressure sensors and process transmitters, which assists in preventing air and water from mixing with the fill fluid. The liquid additives of the present invention undergo compression levels similar to that of typical fill fluids. Thus, the liquid additives will not compress so much that a deflection of isolation diaphragm 52A will be absorbed by fill fluid A, preventing sensing diaphragm 58 from registering a deflection. Thus, with proper calibration of sensor 30 and transmitter circuitry 28, the compressibilities of the liquid additives of the present invention provide a suitable hydraulic fluid. Liquid additives also have adequate viscosity for use with isolation tubes 38A and 38B and sensing diaphragm 58. The liquid additives have lower viscosities than silicone-oil hydraulic fluids. The viscosities, however, are high enough that fill fluid A provides the needed vibration damping to diaphragm 58 to eliminate noise from sensor 30. The reduced viscosity does increase response time of sensor 30, as is described in further detail below. The liquid additives can be used to influence other physical properties of fill fluid A, such as increasing the upper and lower temperature limitations (i.e. freezing and boiling points). It should be noted that some of the identified liquid additives have been used as hydraulic fluids for remote seal systems, such as remote seal system 15. However, in remote seal systems, the fill fluid is not in contact with the pressure sensor or the sensing diaphragm, and thus does not influence the performance of the pressure transmitter and pressure sensor, in ways achieved with the present invention.

Thus, from a design standpoint, the size of electrode plates 60A and 60B forming sensor 30 can be reduced while maintaining the capacitance and output signal strength of pressure sensor 30, without diminishing the performance characteristics of pressure sensor 30 and fill fluid A. Fill fluid A, when comprised of the above described dielectric-enhanced fluids, increases the capacitance of sensor 30 beyond the typical 5 μF to about 10 μF. As such, the high-dielectric constant liquids can be used with standard 1.25-inch diameter pressure sensors that produce greater output signals. However, since it is typically only necessary to produce a sensor signal with a capacitance of 5 μF to about 10 μF, the size and diameter of sensor 30 can be reduced using current manufacturing techniques. For example, current grinding technology permits insulators 64A and 64B to have depths much smaller than 0.0035 inches (~0.00889 cm). Likewise, current deposition technology permits electrodes 60A and 60B to be deposited accurately on insulators 64A and 64B in layers less than 2000 Angstroms (~0.0002 mm). The flexibility of being able to completely replace a hydraulic fluid with a liquid additive, or to mix the liquid additive with a hydraulic fluid in any concentration, enables benefits in pressure sensor 30 that reach beyond size reduction.

Reducing the diameter of sensor 30 and the diameters of cell halves 62A and 62B enables the line pressure of transmitter 12 and pressure sensor 30 to be increased. Cell halves 62A and 62B are typically welded together around their rims at joint 86 such that interior cavity 78 is formed between them. Interior cavity 78 receives fill fluid A, which is pressurized based on the received pressures P1 and P2 at isolation diaphragms 52A and 52B, respectively. Thus, interior cavity 78 is pressurized to cause an outward force on cell halves 62A and 62B and joint 86. The force F exerted by a pressure is determined by the magnitude of the pressure P multiplied by the area A against which it reacts, as shown in equation (2).

$$F = PA \qquad \text{Equation (2)}$$

Thus, the force acting on cell halves 62A and 62B is determined by the magnitude of pressures P1 and P2, and the area of cell halves 62A and 62B. For example, the force acting on cell half 62A is equal to the area inside cell half 62A against which pressure P1 acts, multiplied by pressure P1. Pressure P1 is determined by the line pressure to which isolation diaphragm 52A is connected, which, for example, is ultimately determined by the pressure P1 within vessel 16 (FIG. 1). The maximum force F which joint 86 can withstand depends on the strength of the welded joint. Thus, for a given weld, a cell half having a smaller diameter can withstand a larger line pressure. Conventional 1.25 inch diameter pressure sensors typically have maximum line pressures of about 12,000 psi (~82.8 MPa). According to the present invention, pressure sensor 30 is capable of connecting to line pressures greater than 12,000 psi due to the inclusion of the high-dielectric-constant liquid additive into the hydraulic fluid, and the associated reduction in sensor diameter. It is contemplated that line pressures could be increased up to about three times this limit.

Sensor 30 of the present invention also achieves faster response times over previous capacitive pressure sensors. As the dielectric-enhanced fill fluid of the present invention permits the diameter of pressure sensor 30 to decrease, the volume of fill fluid A within internal cavity 78 decreases proportionally. Thus, the total volume of fill fluid A between, for example, isolation diaphragm 52A and sensing diaphragm 58 also decreases. Therefore, isolation diaphragm 52A and sensing diaphragm 58 need displace less of fill fluid A in response to a change in pressure P1. A change in pressure P1 is therefore more quickly transferred from isolation diaphragm 52A to sensing diaphragm 58.

Another benefit correlated to the reduced volume of fill fluid A required of sensor 30 is the reduction in size of, not only sensing diaphragm 58, but isolation diaphragms 52A and 52B. The reduction in size of sensor 30 and internal cavity 78 inherently reduces the size of electrode plates 60A and 60B, and sensing diaphragm 58, which, as described above, reduces the amount of fill fluid A that needs to be displaced. Because less fill fluid A needs to be displaced, the capacities of sensing diaphragm 58 and isolation diaphragms 60A and 60B to displace fill fluid A can also be displaced. Specifically, the diameter of isolation diaphragms 60A and 60B, which is not tied to the performance of sensor 40, can be reduced. Typically, the diameter of an isolation diaphragm is required to be somewhat larger than a sensing diaphragm as the isolation diaphragm needs to be less stiff. For example, as described above, the depth to which internal cavity 78 extends into each cell half 62A and 62B is approximately 0.0035 inches (~0.00889 cm). Thus, for example, the spacing between electrode plate 60A and sensing diaphragm 58 is much less. Accordingly, sensing diaphragm 58 is only required to displace a small amount of fill fluid A. Isolation diaphragm 52A needs to displace a greater amount to induce the required deflection in sensing diaphragm 58. However, as the scale of sensor 30 and sensing diaphragm 58 decrease, so does the scale of isolation diaphragms 52A and 52B.

The reduction in the size of the components of sensor 30 is beneficial in and of itself. For example, the diameter of sensor 30 can be reduced about forty percent of the size of a standard 1.25-inch diameter sensor to about 0.5 inches. The size reduction has a corresponding effect in reducing the cost of sensor 30 and transmitter 12. For example, the reduction in size of electrode plates 60A and 60B results in a reduction in size of cell halves 62A and 62B, sensing diaphragm 58, insulators 64A and 64B, and isolation diaphragms 52A and 52B. The size of module 42, base 44 and isolation tubes 38A and 38B can be correspondingly reduced. Thus, less material is required to produce sensor 30 and transmitter 12. Sensor 30 and transmitter 12 are typically produced of high-grade materials that are high strength and corrosion resistant. Materials that meet these characteristics, such as Hastelloy or Monel, are premium-priced. Thus, any reduction in the size of transmitter 12, sensor 30 or their components results in significant cost savings.

The benefits of reducing the size of sensor 30 and its associated components also permits wider flexibility in the design of transmitter 12. As mentioned above, the size of module 42 and base 44 can be reduced as a result of shrinking sensor 30. The reduced size of sensor 30 more readily permits the inclusion of multiple sensors within a single transmitter housing. Specifically, the size of module 42 and base 44 can be kept at the standard size required for use with typical 1.25-inch diameter sensors, and the space savings can be used to attach an additional sensor 30 within module 42. For example, in one embodiment, transmitter 12 could include only two isolation diaphragms, such as isolation diaphragms 52A and 52B, but have isolation chambers 72A and 72B be connected each with two isolation tubes connecting with different pressure sensors. One sensor could be configured to sense low pressures and the other sensor could be configured to sense high pressures, thus increasing the overall pressure range that the transmitter can be used with.

Although the present invention has been described with reference to preferred embodiments, workers skilled in the art will recognize that changes may be made in form and detail without departing from the spirit and scope of the invention.

The invention claimed is:

1. A capacitance-based pressure sensor comprising:
    a housing comprising:
        an interior cavity within the housing; and
        a channel extending from an exterior of the housing to the interior cavity;
    a sensing diaphragm disposed within the interior cavity;
    an electrode disposed within the interior cavity opposing the sensing diaphragm; and
    a fill fluid occupying the interior cavity such that a pressure from the channel is conveyed to the sensing diaphragm to adjust a capacitance between the electrode and the sensing diaphragm;
    wherein the fill fluid has a dielectric constant greater than about 3.5.

2. The pressure transmitter of claim 1 wherein a diameter of the electrode is approximately less than 1 centimeter (~0.4 inches).

3. The pressure transmitter of claim 2 wherein a diameter of the electrode is approximately 0.254 centimeters (~0.1 inches).

4. The pressure transmitter of claim 1 wherein a capacitance of the capacitance between the sensing diaphragm and the electrode is approximately five to approximately ten picofarads.

5. The pressure sensor of claim 1 wherein the fill fluid is selected from the group consisting of: isopropyl alcohol, acetone, ethylene glycol and glycerin.

6. The pressure sensor of claim 1 wherein the fill fluid comprises a blend of a hydraulic fluid and a liquid additive.

7. The pressure sensor of claim 6 wherein the liquid additive comprises from about ten to about twenty percent citric acid.

8. The pressure sensor of claim 6 wherein the liquid additive is selected from the group consisting of: isopropyl alcohol, acetone, ethylene glycol and glycerin.

9. The pressure sensor of claim 8 wherein the hydraulic fluid and the liquid additive are at least partially miscible.

10. The pressure sensor of claim 9 wherein the liquid additive comprises up to about fifty percent of the fill fluid.

11. The pressure sensor of claim 8 wherein the hydraulic fluid and the liquid additive comprise a homogeneous mixture.

12. The pressure transmitter of claim 11 wherein the hydraulic fluid comprises a silicone-based oil.

13. The pressure sensor of claim 6 wherein the liquid additive reduces viscosity of the fill fluid.

14. The pressure sensor of claim 1 wherein the fill fluid has a dielectric constant of approximately 18 or higher.

15. A pressure sensor comprising:
    a cell body comprising:
        an interior cavity;
        a sensing diaphragm disposed within the interior cavity to divide the interior cavity into first and second chambers;
        a first interior surface within the first chamber facing the sensing diaphragm; and
        a second interior surface within the second chamber facing the sensing diaphragm;
    a first electrode disposed on the first interior surface to form a first capacitor with the sensing diaphragm;
    a second electrode disposed on the second interior surface to form a second capacitor with the sensing diaphragm;
    a fill fluid disposed within the first and second chambers, the fill fluid being adapted to receive pressures to adjust the position of the sensing diaphragm and change the capacitances of the first and second capacitors; and
    wherein the fill fluid has a dielectric constant greater than about 3.5.

16. The pressure sensor of claim 15 and further comprising:
    a first lead wire extending from the first electrode to an exterior of the cell body;
    a second lead wire extending from the second electrode to the exterior of the cell body;
    a first insulator positioned within the first chamber to comprise the first interior surface;
    a second insulator positioned within the second chamber to comprise the second interior surface; and
    a first isolation tube having a first end connected to the first chamber and a second end opened to the exterior of the cell body; and
    a second isolation tube having a first end connected to the second chamber and a second end opened to the exterior of the cell body;
    wherein the fill fluid is disposed in the first isolation tube and the second isolation tube.

17. The pressure sensor of claim 15 wherein the fill fluid is selected from the group consisting of: isopropyl alcohol, acetone, ethylene glycol and glycerin.

18. The pressure sensor of claim 15 wherein the fill fluid comprises a solution of a hydraulic fluid and a liquid additive, wherein the solution is at least partially miscible.

19. The pressure sensor of claim 18 wherein:
    the liquid additive is selected from the group consisting of: isopropyl alcohol, acetone, ethylene glycol and glycerin; and
    the hydraulic fluid comprises a silicone-oil.

20. The pressure sensor of claim 15 wherein the liquid additive reduces viscosity of the fill fluid.

21. The pressure sensor of claim 15 wherein diameters of the first and second electrodes are approximately less than 1 centimeter (~0.4 inches), and a capacitance of the first and second capacitors is approximately five to approximately ten pico-farads.

22. A pressure transmitter for measuring a pressure of a process fluid, the pressure transmitter comprising:
    a transmitter housing;
    a capacitance-based pressure sensor for sensing the pressure of the process fluid, wherein the pressure sensor:
        is disposed within the housing;
        comprises a cell body having a diameter less than approximately 3.175 centimeters (~1.25 inches); and
        has a capacitance in the range of is approximately five to approximately ten pico-farads;
    a hydraulic relay system comprising:
        an isolation diaphragm positioned on an exterior of the transmitter housing; and an isolation tube extending from the pressure sensor to the isolation diaphragm;

a pressure sensor fill fluid situated within the hydraulic relay system and comprising a high-dielectric constant liquid fluid selected from the group consisting of: isopropyl alcohol, acetone, ethylene glycol and glycerin; and transmitter electronics positioned within the housing, the transmitter electronics configured to receive and condition pressure signals from the pressure sensor.

23. The pressure transmitter of claim 22 wherein the line capacity of the pressure sensor is approximately 12,000 psi (~82.7 mega-Pascals).

24. The pressure transmitter of claim 22 wherein the fill fluid has a dielectric constant greater than approximately 3.5.

25. The pressure transmitter of claim 22 wherein the fill fluid further comprises a hydraulic fluid for transmitting a change in the pressure of the process fluid to the sensor.

26. The pressure transmitter of claim 25 wherein the liquid fluid has a dielectric constant higher than that of the hydraulic fluid.

27. The pressure transmitter of claim 22 wherein the cell body has a diameter of approximately 1.27 centimeters (~0.5 inches).

* * * * *